C. REEVES.
OILING SYSTEM FOR ENGINES.
APPLICATION FILED MAY 13, 1907.

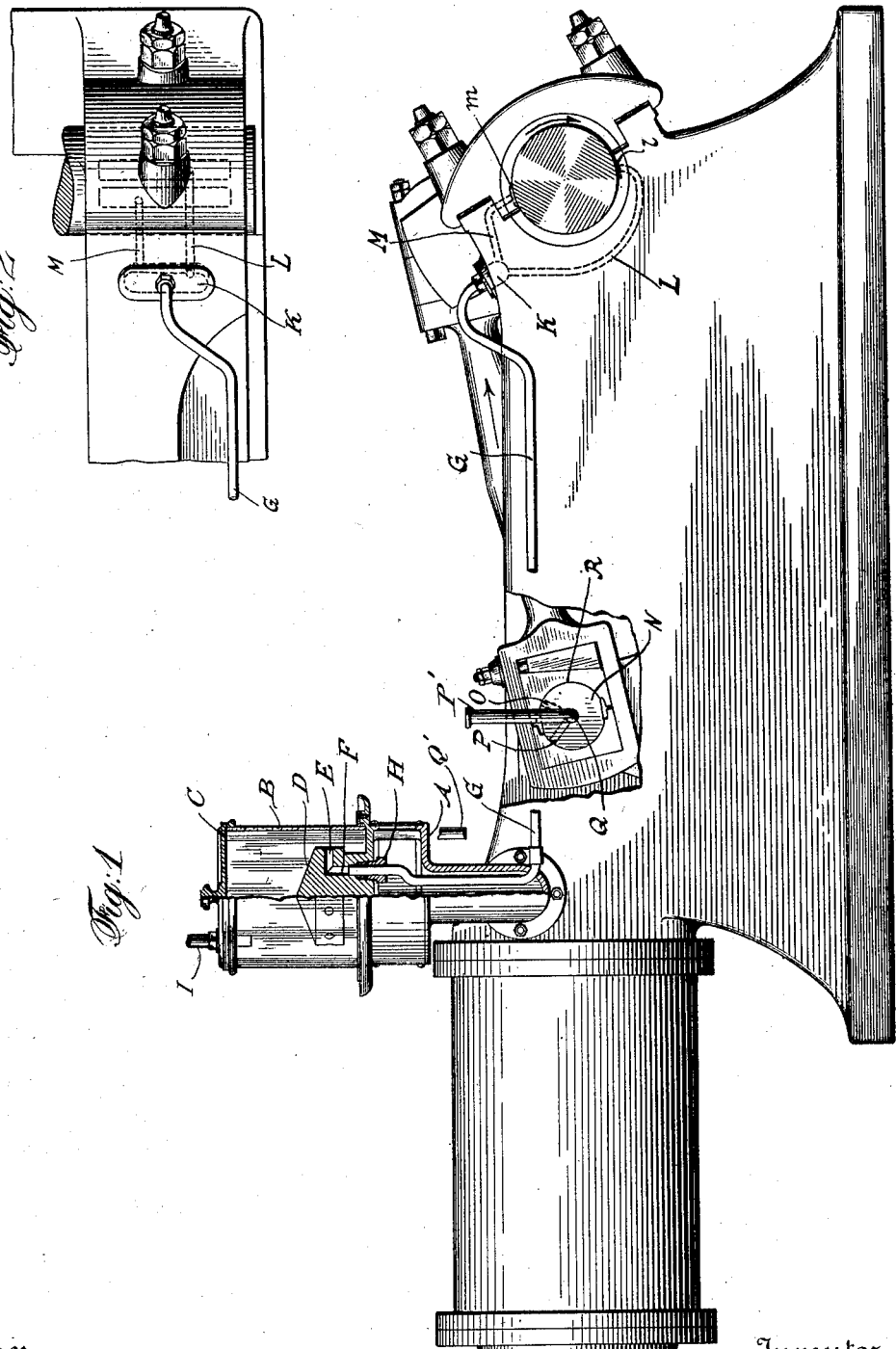

1,034,143.

Patented July 30, 1912.
2 SHEETS—SHEET 2.

Witnesses:
Max B. A. Doring
Isabel Pearse

Inventor
Clifton Reeves
By his Attorneys
Prindle and Williamson.

UNITED STATES PATENT OFFICE.

CLIFTON REEVES, OF TRENTON, NEW JERSEY, ASSIGNOR TO TRENTON ENGINE CO., OF TRENTON, NEW JERSEY.

OILING SYSTEM FOR ENGINES.

1,034,143. Specification of Letters Patent. Patented July 30, 1912.

Application filed May 13, 1907. Serial No. 373,309.

*To all whom it may concern:*

Be it known that I, CLIFTON REEVES, of Trenton, in the county of Mercer, and in the State of New Jersey, have invented a certain new and useful Improvement in Oiling Systems for Engines, and do hereby declare that the following is a full, clear, and exact description thereof, reference being had to the accompanying drawings, in which—

Figure 3:
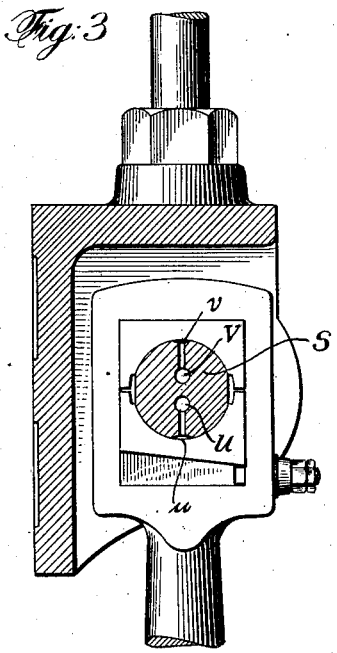
Figure 4:
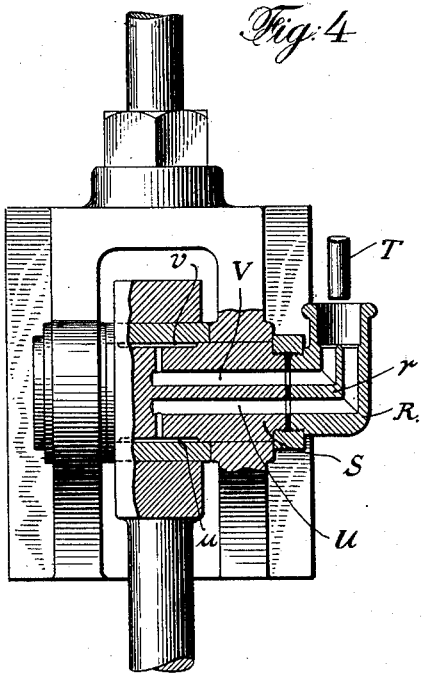
Figure 5:
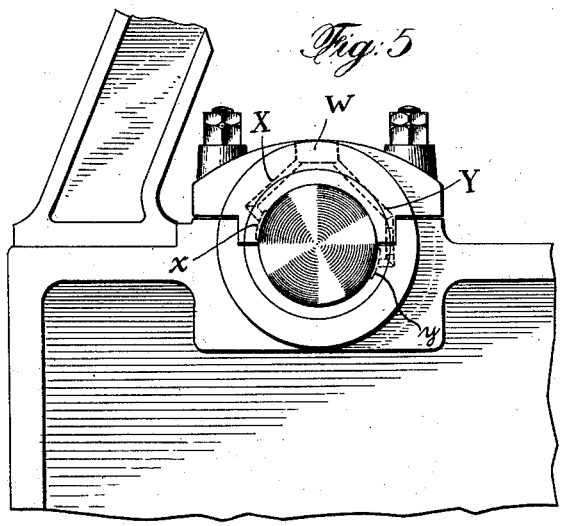
Figure 6:
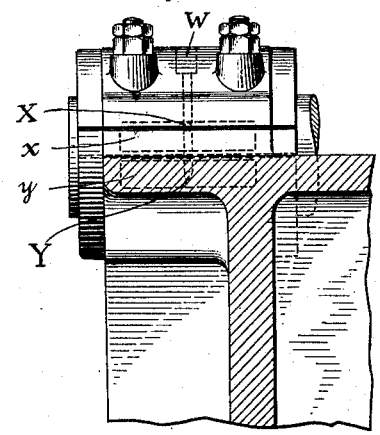

Figure 1 is a side elevation partly in section of a horizontal engine having an oiling system embodying my invention applied thereto. Fig. 2 is a plan view, partly in section of a journal bearing of Fig. 1. Figs. 3 and 4 each are vertical sectional views at right angles to each other of the cross-head pin of a vertical engine having my system of oiling applied thereto. Figs. 5 and 6 are respectively an end elevation and a side elevation, partly in section, of the crank shaft bearing of a vertical engine having my system of oiling applied thereto.

The object of my invention has been to provide a system of oiling engines whereby the flow of oil may be under constant observation, and whereby oil shall be supplied to the loose sides of rotating or oscillating pins, or shafts, which are subjected to pressure occurring alternately in opposite directions, and to such ends my invention consists in the oiling system hereinafter specified.

In carrying my invention into practice, I provide an oil reservoir comprising a, preferably, cast base, (A) that is secured to the frame of the engine, said base supporting a glass tank (B) that is fitted to the base with a gasket, the tank (B) being provided with the cover (C). Within the tank, and rising from the base, is a monitor (D), having a series of holes (E) of any desired shape, but at the same level in its vertical faces. The holes (E) each communicate with vertical holes (F), there being pipes (G) connected with holes (F) and packed by stuffing boxes (H). Oil is supplied to the tank by a pipe (I), which may have a controlling valve, not shown. The various pipes (G) lead to the various bearings to be lubricated.

I will first describe the manner of lubricating the crank shaft: Pipe (G) for the crank shaft empties into a cup or pocket (K) formed in the bearing, from which extend ducts (L) and (M), respectively, to the lower and upper sides of the bearing where they open into pockets or cups in the bearing.

The operation is as follows: Oil is supplied to the tank by the pipe (I) in such a quantity that the oil fills the tank only to the level of the holes E, and then enters the holes and flows into the pipes (G) the level being maintained in this manner. The holes (E) are always fully open to inspection, and any stoppage can be quickly detected. If a hole becomes clogged, the obstruction is readily gotten at by taking off the cover (C). By the pipe (G) the oil is delivered to the cup (K) and flows into ducts (L) and (M). When the pressure from the connecting rod is in the direction of the arrow on the rod, the tendency will be to relieve the pressure between the crank shaft and the bearing at the cylinder side of the shaft, and thus to make a space within which the oil can flow. The crank shaft rotating in the direction of the arrow adjacent said shaft, will carry the oil around with it from the lower pocket into the said space. At this time the upper pocket will be closed, owing to the pressure of the shaft against the same. When the crank pin has passed the forward dead center, and the pull of the shaft is toward the cylinder, the pressure between the shaft and the right hand or forward side of the bearing will be relieved, and oil will be carried from the upper pocket into the space, thus formed, the lower pocket being meanwhile closed, owing to the pressure of the shaft against the same. The rotation of the shaft will carry oil first from one pocket, and then from another, so as to keep the shaft practically running on a film of oil. Thus the shaft is automatically supplied with oil first from one loose side, and then from the other, and a most efficient oiling results from a very simple construction.

The same principle can be applied to the cross-head pin (N). This pin is supplied with oil holes (O) and (P), running from a central duct (Q) upwardly, the one in a forward direction and the other in a rearward direction. The hole (Q) is supplied with oil by any suitable means, such as a pipe P', the pipe wiping drops of oil from the lower end of a stationary pipe (Q'). When the cross-head is moving toward the crank shaft, the cross-head pin (which is fastened into the cross-head) will be forced against the brass in the connecting rod at the point (R) and will stop the oil flowing out of the hole (O); but as this same action will relieve the pressure on the hole (P), the oil will flow from said hole into a groove formed either in the pin or the brass, and will then fill the space from the rear side of the pin. When the motion is reversed, and the crosshead is traveling away from the shaft, there will be a film of oil between the surface of the pin and the brass at the rear side of the pin, and the crank side of the pin will be relieved and will be supplied with oil from the hole (O).

The same principle can be applied to the cross-head pin of a vertical engine, as shown in Figs. 3 and 4. Here a special form of oil cup (R) is used, such cup being fastened to the pin (S) and receiving oil from the pipe (T) above the open end of the cup. The cup is provided with a partition (r) dividing it into two parts, with which are connected ducts (U) and (V) that lead to grooves or pockets $u$ and $v$ formed in the pin. When the strain is downward on the pin, the upper side will be relieved and oil will flow into the space thus formed through the pocket (V). When the strain is upward on the pin, the duct (V) will be closed by the pressure, and the lower duct U will be open, from which oil will flow.

The same principle is applicable to the crank shaft bearing of a vertical engine, as illustrated in Figs. 5 and 6. Here oil is supplied to the cup or pocket (W) formed in the cap of the bearing and is led at the ducts (X) and (Y) to the opposite sides of the bearing, where grooves or cups ($x$) and ($y$) extend along the bearing horizontally. The grooves ($x$) and ($y$) are formed at such a level that they will be directly in the lines of pressure of the shaft so that they will be alternately opened and closed. The operation in the case of a vertical crank shaft bearing is the same as that in the case of the horizontal engine bearing heretofore described, and it will therefore not be necessary to describe it.

It will be noticed that in all of the forms of my system illustrated, there are two pockets in each bearing so located as to be alternately opened and closed by the pressure of the part being lubricated, and each of these pockets is supplied by a separate duct. Not only does the opening of the duct by the pressure of the shaft permit a flow of oil from the relieved side of the shaft, but the adhesion of the oil to the shaft causes it to be carried around on the shaft into the spaces thus formed. Thus the shaft practically runs on a film of oil.

It is obvious that the principle of my invention can be applied in various forms, and I desire not to be limited to the specific construction illustrated, but to have my claims given the broadest interpretation consistent with their terms and the prior art.

I claim:

1. An oiling system for engines comprising a glass tank, a monitor within the tank, said monitor having a series of holes at the same level, means for supplying oil to said tank to the level of said holes, and connections between the respective holes and the bearings of the engine.

2. In an oiling system for engines, the combination of a glass tank, a monitor mounted within said tank, and having a series of holes in its vertical face, formed at the same level, means for supplying oil to said tank to the level of said holes, and connections between said holes and the bearings of the engine.

3. In an oiling system for engines, the combination of a glass tank having a removable cover, a part within the tank having a series of holes formed at the same level in a vertical face thereof, means for supplying oil to said tank to the level of said holes, and pipes connecting said holes with bearings to be oiled.

In testimony that I claim the foregoing I have hereunto set my hand.

CLIFTON REEVES.

Witnesses:
 STEPHEN C. COOK,
 JOHN WRIGHT.